Figure 5:
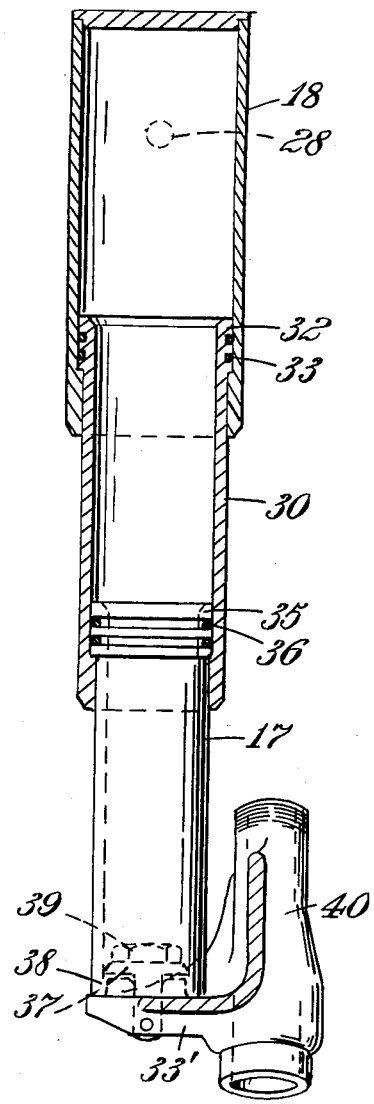

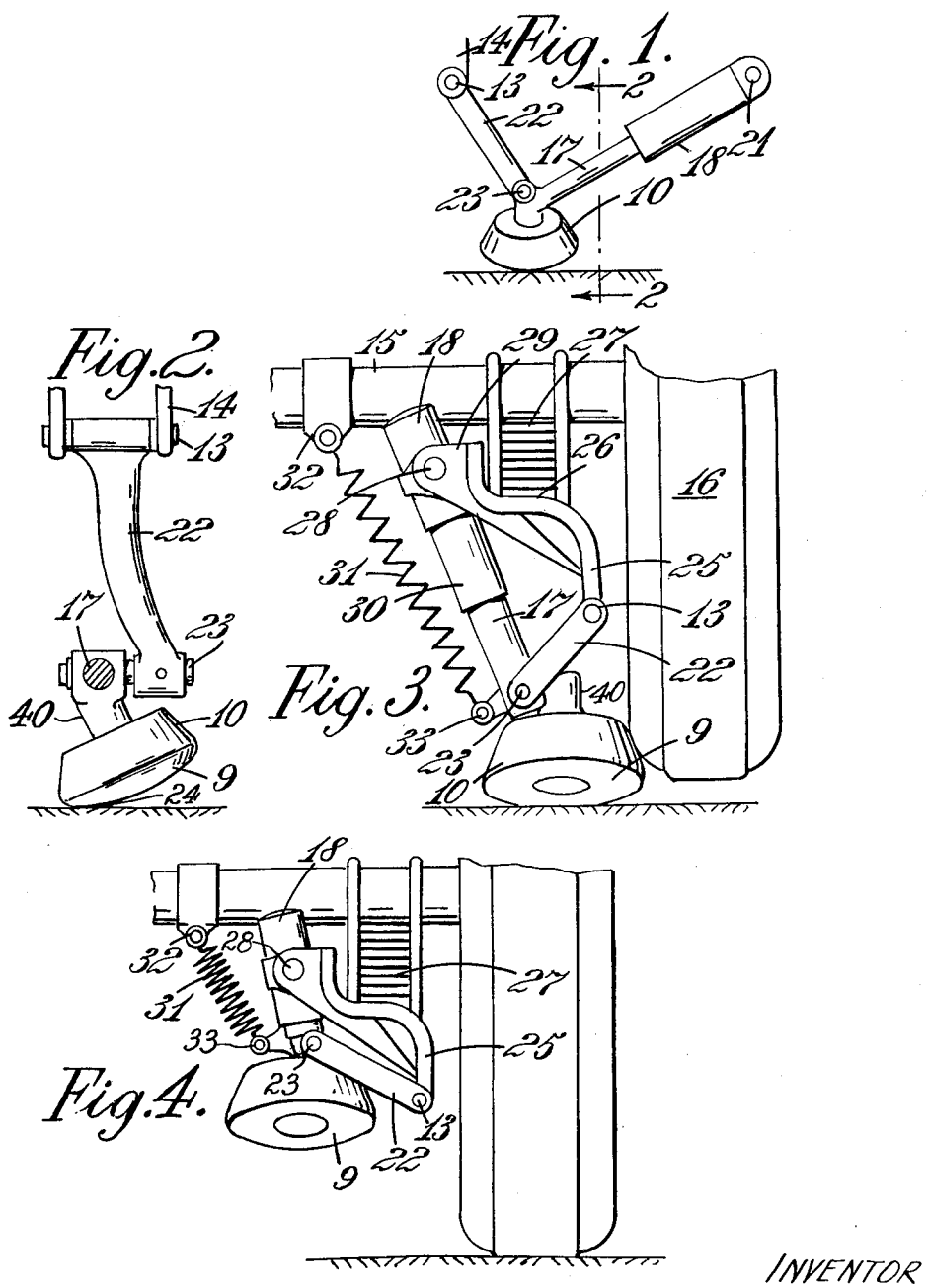

Oct. 9, 1962 A. J. BUTTERWORTH 3,057,424
APPARATUS FOR MANEUVERING MOTOR VEHICLES IN CONFINED SPACES
Filed Feb. 24, 1958 6 Sheets-Sheet 2

INVENTOR
ARCHIBALD JAMES BUTTERWORTH
BY Irwin S. Thompson
ATTY

Oct. 9, 1962 A. J. BUTTERWORTH 3,057,424
APPARATUS FOR MANEUVERING MOTOR VEHICLES IN CONFINED SPACES
Filed Feb. 24, 1958 6 Sheets-Sheet 3
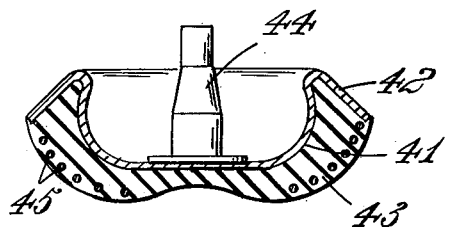
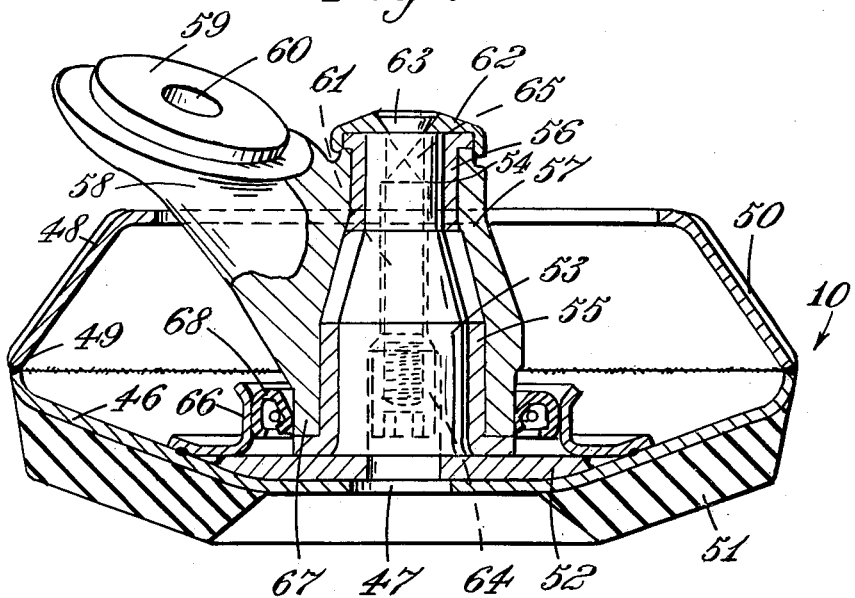
INVENTOR.
ARCHIBALD JAMES BUTTERWORTH
By Irwin S. Thompson
ATTY.

INVENTOR
ARCHIBALD JAMES BUTTERWORTH
BY Irwin S. Thompson
ATTY

Oct. 9, 1962 A. J. BUTTERWORTH 3,057,424
APPARATUS FOR MANEUVERING MOTOR VEHICLES IN CONFINED SPACES
Filed Feb. 24, 1958 6 Sheets-Sheet 5

INVENTOR

ARCHIBALD JAMES BUTTERWORTH

BY Irwin S. Thompson
ATTY.

Oct. 9, 1962 A. J. BUTTERWORTH 3,057,424
APPARATUS FOR MANEUVERING MOTOR VEHICLES IN CONFINED SPACES
Filed Feb. 24, 1958 6 Sheets-Sheet 6

INVENTOR
ARCHIBALD JAMES BUTTERWORTH
BY Irwin S. Thompson
ATTY.

United States Patent Office 3,057,424
Patented Oct. 9, 1962

3,057,424
APPARATUS FOR MANEUVERING MOTOR
VEHICLES IN CONFINED SPACES
Archibald James Butterworth, Frimley, near Aldershot, England, assignor to Sidler Limited, London, England, a British company
Filed Feb. 24, 1958, Ser. No. 716,945
Claims priority, application Great Britain Feb. 26, 1957
10 Claims. (Cl. 180—1)

This invention relates to apparatus for maneuvering motor vehicles in confined spaces and of the general kind described in copending application Serial No. 578,351, filed April 16, 1956, and since issued as Patent No. 2,964,118, in which an auxiliary ground-engaging roller is carried on an extensible arm near each vehicle driven wheel.

One of the objects of the present invention is to reduce the frictional wear on the edge of the rollers as the rollers are swung into contact with the ground.

Another object of the invention is to increase the frictional grip between each roller and the side of a road wheel.

According to this invention an apparatus of the kind referred to above for maneuvering a vehicle in a confined space is characterised in that each auxiliary wheel is rotatably mounted on one part of a telescopic structure another part of which is attached to a part of the road wheel mounting, for example to the axle casing so as to swing about a fore and aft axis and in that means are provided for contracting or extending the parts of the telescopic structure in the direction of the length thereof and in that means are provided for constraining the outer and lower member of the telescopic structure which carries the auxiliary wheel to move in such a path that a part on the convex undersurface of the auxiliary wheel is the first to contact with the ground.

In such an arrangement each of the auxiliary wheels is preferably so mounted on said part of the telescopic structure and is so constrained to move that said part of the auxiliary wheel which first contacts with the ground is disposed to one side of the upright plane in which the axis of rotation of the auxiliary wheel swings. Thus with this arrangement continued swinging movement of the auxiliary wheel after it contacts with the ground causes the wheel to rotate without substantial sliding along the ground thus reducing wear.

The aforesaid telescopic structure preferably comprises a single or double acting ram so arranged that in the former case it imparts downward swinging movement to the auxiliary wheel, by energisation of the ram whilst return movement may be imparted by a spring whereas in the latter case both movements may be effected by energising the ram.

The means for constraining the free extremity of the telescopic structure to move in the required path may comprise a linkage connected between it and a part of the mechanism on which the road wheel is mounted.

The aforesaid linkage may comprise a link which is pivotally connected at one end to a part on which the road wheel is mounted at a point nearer the road wheel than is the pivotal attachment of the upper end of the telescopic structure whereas the other end of said link is pivotally connected to the outer or lower member of the telescopic structure. The pivotal connections at the upper ends of the link and the upper end of the telescopic structure may either be at the same level or the pivotal connection of the former may be at a lower level than the latter.

The aforesaid ram may comprise more than two telescopic parts the upper part which is pivotally connected to the part which carries the road wheel and may comprise a hollow cylinder in which reciprocates a tubular plunger open at both ends and another tubular plunger of smaller diameter reciprocates in the first said plunger and is closed at its lower end to which is fixed a bearing for a rotary mounting for the auxiliary wheel.

One form of auxiliary wheel or roller according to this invention comprises a cup shaped metal shell having a conical rim portion arranged at an appropriate angle to engage the side or tread of the road wheel, rubber or rubber like plastic bonded to the outer surface of the bottom of the metal shell, leaving the conical portion uncovered and a spindle attached to the inner surface of the bottom of the cup.

The outer surface of the conical rim portion may be fluted or ribbed to increase its grip on the road wheel. Alternatively the rim portion may be substantially cylindrical and the rubber or plastic is bonded to the outer surface and is shaped to provide a conical face and in order to increase the grip between the face and the road wheel friction fillers may be included in that part of the rubber or rubber like plastic.

In either of the above arrangements the outer surface of the rubber or plastic part may be substantially spherical.

In order to increase the wearing properties of this outer surface there may be embedded in its wear resisting material for example a spiral of metal wire.

The following is a more detailed description of a number of alternative forms of the invention reference being made to the accompanying diagrammatic drawings in which—

Figure 8:
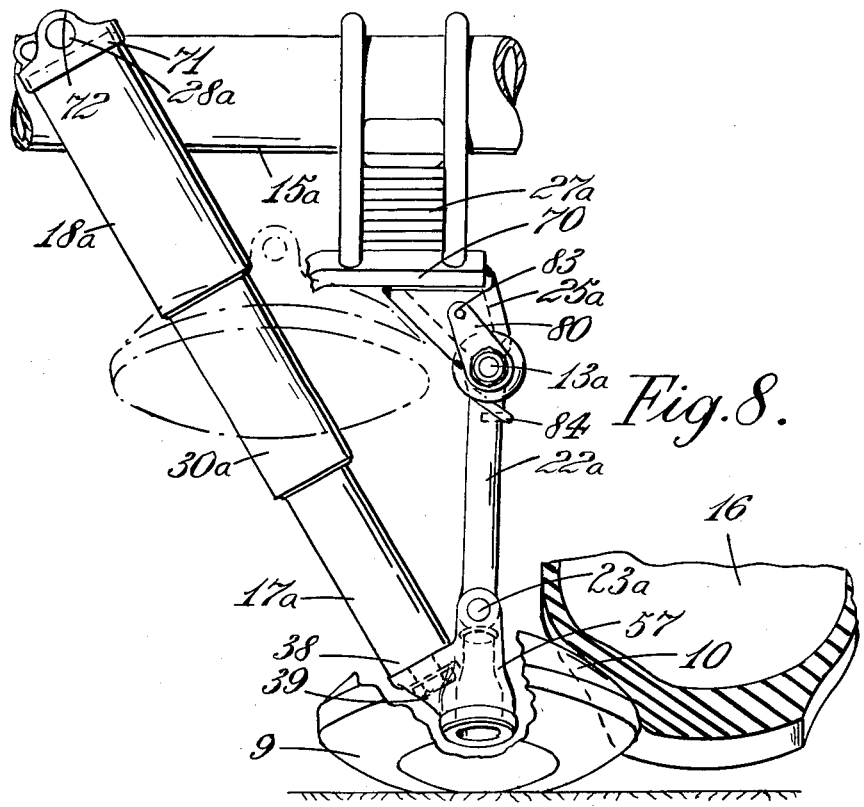
Figure 9:
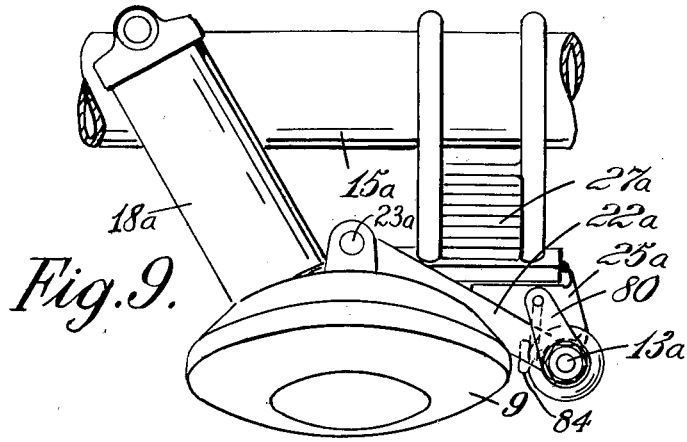
Figure 10:
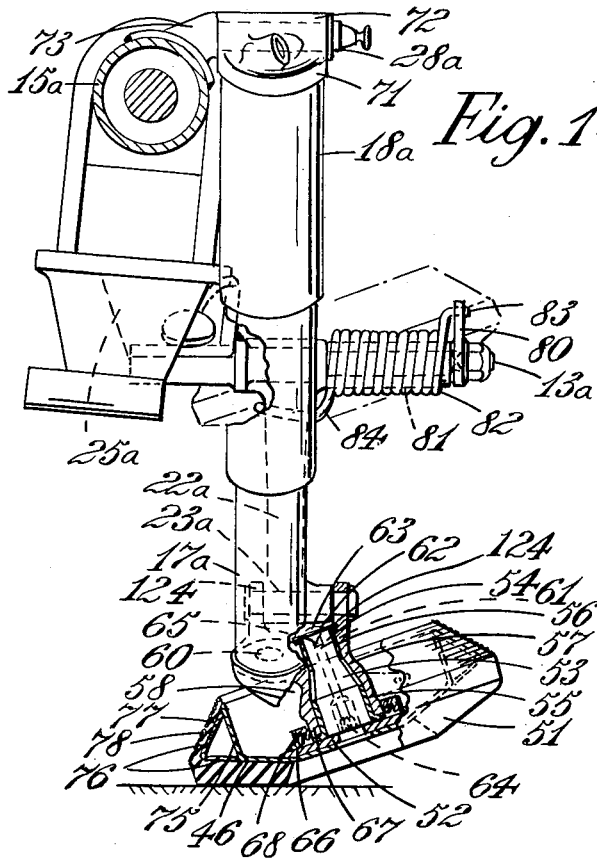
Figure 11:
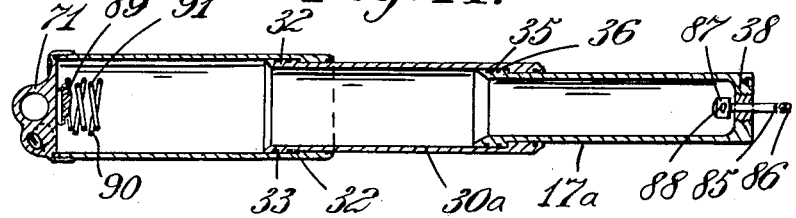
Figure 12:
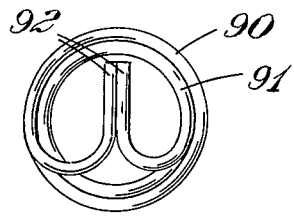
Figure 13:
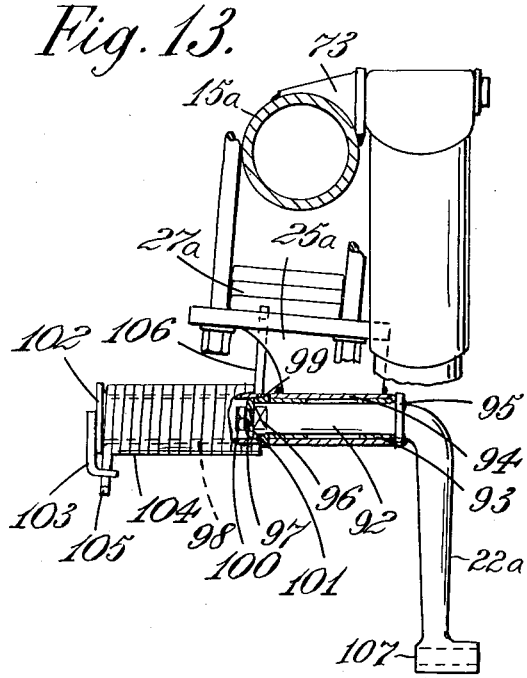

FIGURE 1 is a front elevation of one of the auxiliary wheels and one form of mounting whereby it may be swung sideways in an up-and-down direction, FIGURE 2 is a section on the line 2—2 of FIGURE 1, looking in the direction of the arrows, FIGURE 3 is a similar view to FIGURE 1 showing an alternative mounting for the auxiliary wheel and showing the wheel in its lowermost position, FIGURE 4 is a similar view to FIGURE 3 showing the auxiliary wheel in its elevated position, FIGURE 5 is a section through the ram shown in FIGURES 3 and 4, FIGURES 6 and 7 are sections through alternative forms of roller suitable for use with the above mountings, FIGURE 8 is a similar view to FIGURE 3 showing a modified arrangement of control link and spring and showing the parts in an extended position, FIGURE 9 is a similar view to FIGURE 8 showing the parts in a contracted position, FIGURE 10 is a view looking from the left of FIGURE 8, FIGURE 11 is a longitudinal section through the telescopic ram of FIGURES 8 to 10, FIGURE 12 is an end view of the spring assembly, and FIGURE 13 is a similar view to that of FIGURE 10 showing an alternative arrangement of return spring.

In the arrangement according to the invention shown in FIGURE 1 the auxiliary wheel 10 is rotatably mounted on a spindle 44 (see FIG. 6) fixed rigidly to the end of the plunger 17 its axis being at an angle to the axis of the plunger. The ram cylinder 18 is pivoted at 21 to a part of the wheel axle casing 15 (FIG. 3). The lower end of a link 22 is pivotally connected at 23 to the end of the plunger 17 and its other end is pivotally connected at 13 to a bracket 14 fixed to the wheel axle casing. The length of the link 22 and the disposition of the axes of the pivotal connections 13 and 21 and the angular position of the axis of revolution of the auxiliary wheel 10 are so chosen that when the auxiliary wheel first comes into contact with the ground the point of contact is on the outer surface 9 as indicated at 24 in FIGURE 2 and which is to one side of the plane in which the axis of rotation of the auxiliary wheel swings. As in the construction illustrated by FIG. 2 of applicant's U.S. Patent No. 2,964,118, the axis of rotation of the auxiliary wheel is at an angle to a transverse vertical plane containing the aforesaid ram and link, one of the auxiliary wheels being inclined on one side of the plane and the axis of rotation of the other auxiliary wheel being inclined on the opposite side of the said plane whereby rotation of the two road wheels in the same direction will rotate the two auxiliary wheels in such a manner that they both impart the same lateral movement to the vehicle.

The arrangement shown in FIGURES 3 and 4 is very similar to that described above but is shown associated with a road wheel 16 on the opposite side of the vehicle to the first said wheel. Again in this instance the lower end of the link 22 is pivoted at 23 to the plunger 17 of the ram but the upper end of the link is pivoted at 13 to a bracket 25 which extends downwardly from the supporting platform 26 for the vehicle spring 27. The cylinder 18 of the ram is provided with trunnions 28 mounted in bearings in lugs 29 extending laterally from the spring supporting bracket 26. The ram is provided with an intermediate telescopic portion 30 as described later with reference to FIGURE 5. A tension spring 31 extends from an anchorage 32 on the wheel axle casing 15 to a foot piece 33 at the lower end of the ram plunger 17 which foot piece carries the housing 40 for spindle 44 for the auxiliary wheel. The parts are shown in their contracted position in FIGURE 4 where it will be seen that the auxiliary wheel has been moved upwardly and inwardly away from the inner side of the wheel.

As will be seen from FIGURE 5 there is reciprocably mounted in the upper cylinder 18 a tubular ram 30 having a slightly larger head 32 provided with packing 33. Reciprocably mounted in the tubular ram 30 is a second tubular ram 17 having an enlarged head 35 and packing 36. The lower end of the tubular ram 17 is closed by a closure member 37 which is drawn against an internal shoulder 38 by a screw 39 engaging a threaded hole in a foot piece 33'. The foot piece 33' has secured to it a housing 40 for the spindle of the auxiliary wheel.

Due to the provision of the spring 31 only a single supply conduit is required for the ram which may comprise a pipe which is clipped to the rear axle casing and has a T connection at its centre for connection with a hose leading from a pump driven by the vehicle engine and each end of the conduit on the back axle casing is connected by a flexible hose either to the swinging end of the ram cylinder or to one of the trunnions of the ram cylinder which may be hollow.

As shown in FIGURE 6 each auxiliary wheel or roller may comprise a cup shaped part 41 pressed from sheet steel and having a conically shaped flange portion 42 arranged at a suitable angle for engaging the side of the road wheel. A rubber or plastic body 43 is bonded to the outer face of the metal shell and between it and the conical flange portion 42. Secured to the upper surface of the bottom wall of the cup shaped member is a spindle 44 which is arranged to be accommodated in a bearing at the end of the supporting arm as best seen in FIGURE 7. The outer surface of the conical flange portion 42 may be fluted so as to increase its adherence with the rubber of the tire of the road wheel.

In order to increase wear resisting properties of the rubber or plastic body 43 it may have moulded into it a wire spiral 45. In an alternative form of construction such as shown at 78 of FIG. 10 the conical flange 42 may be omitted leaving an exposed conical face of the rubber body 43 and in order to increase the grip between that conical face and the tire for the wheel there may be incorporated in the face friction particles.

In the construction shown in FIGURE 7 the auxiliary wheel or roller 10 is built up from two metal pressings comprising a dished shaped pressing 46 having a hole 47 at the centre thereof and a conical pressing 48 which is welded to the dished shaped pressing at 49. The outer surface of the conical pressing 48 may be fluted or serrated as indicated at 50. Bonded to the outer surface of the dished shaped pressing 46 is a rubber or plastic body 51 which in cross section is trapezium in shape. To the inner surface of the dished shaped pressing 46 is welded a flange 52 formed on a journal portion 53 of a hollow spindle. A second journal portion 54 of smaller diameter than that of 53 is formed on the upper end of the spindle 44. The spindle is supported in two bearings 55 and 56 which engage respectively the two journal portions and are themselves located in a hub portion 57 at the end of an inclined arm 58. The inclined arm is arranged for attachment by means of a boss 59 to the lower end of the telescopic part 17 shown in FIGURE 3. A bolt extending through a hole 60 in the boss engages a threaded hole in the bottom of a part 17. The spindle is retained within the arm by a bolt 61 which extends through a hole in a cap member 62 arranged over the bearing 56 the head 63 of which bolt engages the countersunk portion of said hole in the cap. The bolt 61 is prevented from rotating by a square portion 65 which engages a broached square hole in the spindle 44. The bolt 61 is engaged by a nut 64 having a conical seating which engages a similar seating in the hole of the spindle 44. The nut is also provided by a hexagonal socket for engagement by a suitable key. The cap member 62 is flanged and prevents dirt from entering the top of the spindle. Dirt is prevented from reaching the journal portion 53 and the bearing 55 by means of a shroud 66 which is secured to the dished pressing 46 and is spaced away from a said cylindrical portion 67 formed on the hub portion 57. Suitable packing ring 68 being disposed in the space between the shroud and the cylindrical part.

The arrangement shown in FIGURES 8 to 10 is somewhat similar to that of FIGURE 3. It will be seen, however, from FIGURE 8 that when the parts are in an extended position the link 22a between the bracket 25a and the hub portion 57 is substantially vertically disposed instead of being inclined to the vertical. Also the bracket 25a is secured to the clamping plate 70 for the axle spring 27a. Also in place of the upper portion of the cylinder 18a of the hydraulic ram being provided with trunnions mounted in bearings in the bracket, the cylinder cover 71 is provided with a bearing 72 through which the pivot pin 28a extends and which pivot pin is fixed to a bracket 73 secured to the axle casing 15a. The road engaging roller 10 is mounted on the plunger 17a of the hydraulic ram in a similar manner to that described with reference to FIGURE 7, the hub portion 57 being provided with an inclined arm 58 which is secured to the ram. The hub portion is also provided with two lugs 124 through which the pivot pin 23a extends. The aforesaid pivot pin also extends through an aperture 107 at the end of the link 22a as shown in FIG. 13. The metal shell of the ground engaging roller is also somewhat differently formed from that in FIGURE 7. The dished bottom wall 46 is provided with a cylindrical flange portion 75 to which is welded a V-shaped rim 76 and the rubber is arranged to extend over the upper portion of the rim at 77 and as indicated earlier the surface of this part of the rubber may be provided with wear-resisting fillers indicated at 78 and which may comprise asbestos fibres or canvass inserts or other fibres.

Instead of a helical tension spring 31 being provided to assist in the upward swing of the telescopic hydraulic ram, the fixed pivot pin 13a which connects the link 22a to the bracket 25a is extended beyond one side of the link and has fixed to it an anchor plate 80. The extended portion of the pin 13a is encircled by a sleeve 81 and encircling the sleeve is a helical spring 82 one end 83 of which engages a hole in the anchor plate 80 and the other end 84 is looped around the link 22a, the winding of the spring is such as to tend to swing the link upwardly. The telescopic hydraulic ram is formed in a similar manner to that described with reference to FIGURE 5. In this instance, however, the shoulder 38 at the bottom of the second tubular ram 17a is connected to the inclined arm 58 on the hub 57 by a screw 39 which has a passage extending through it and extending through the passage is an adjustable anchor bolt 85 the screwed extremity 86 of which is engaged by an adjusting nut (not shown). The head 87 of the bolt within the ram is provided with a cross passage 88. The cylinder cover 71 is provided with a projection 89 also formed with a cross passage. Disposed within the hydraulic ram are two nested oppositely wound helical tension springs 90, 91 (see FIGURES 11 and 12). Each end of the nested springs have their end convolutions bent together as indicated at 92 in FIGURE 12, and the bent ends are inserted respectively through passages formed in the head 87 and projection 89. The spring system can be pre-loaded by the rotation of the aforesaid adjustment nut on the bolt 85. With this arrangement the hydraulic ram can be single acting and the return movement in an upward direction is provided by the dual spring system.

In an alternative arrangement shown in FIGURE 13 instead of the link 22a rotating about a fixed pivot pin it has formed at one end integrally with it a shaft 92 at right angles to it and at the other end an aperture 107 for receiving pivot pin 23a. The shaft is rotatably mounted in a bearing sleeve 93 mounted in a fixed part 94 of the bracket 25a to which the springs 27a are anchored. The shaft 92 has a shoulder 95 at one end and at the other is provided with two flats 96 and a screw threaded extension 97. A tubular element 98 has welded to it at one end a collar 99 having a hole formed therein and which is shaped to engage said flats. A nut 100 engages the threaded extension 97 a washer 101 being provided between the nut and collar. Thus the tubular element 98 is firmly clamped to and rotates with shaft 92. The outer end of the tubular element 98 is outwardly flanged at 102 and has welded to it a finger 103. A square section helical spring 104 encircles the tubular element 98 and one end 105 thereof engages the finger. The other end 106 is extended upwardly and engages a part of the bracket 25a.

I claim:

1. An apparatus for maneuvering in a confined space a motor vehicle having two driven road wheels, comprising for each road wheel a road-engaging roller and a hydraulic means having a cylinder and plunger, a mounting rotatably supporting the road-engaging roller and rigidly fixed direct to the plunger to move bodily therewith, said cylinder being pivotally connected to said vehicle, a link pivotally connected between a part of the vehicle and a part moving with each hydraulic means for constraining said roller to move towards and away from the ground and the side of one of said road wheels, said roller having a part formed with an undersurface for engaging the road when the hydraulic means is extended and an integral part having a coaxial peripheral surface adjacent said undersurface at an angle thereto when viewed in an axial section thereof for engaging a part of its associated road wheel at the limit of sideways movement of said roller, a bearing disposed in said mounting, and a spindle mounted on said roller and disposed in said bearing, said spindle and bearing having an axis inclined in a fore-and-aft direction with respect to the vehicle when the hydraulic means and roller are in an extended position, said axis intersecting said undersurface of said roller and so disposed that said undersurface is the first to engage the ground upon the hydraulic means being extended.

2. An apparatus according to claim 1 wherein said hydraulic means is single acting, and further comprising an external spring connected between the plunger of the hydraulic means and a fixed part of the vehicle on the opposite side of the hydraulic means to said link so as to swing the link upwardly in addition to retracting the hydraulic means.

3. An apparatus according to claim 1 wherein said hydraulic means is single acting, and further comprising nested oppositely wound helical springs connected internally between the end of the cylinder and plunger of the hydraulic means, which springs at one end are connected together and to a rotatably adjustable member.

4. Apparatus according to claim 1 wherein the pivotal connection of said link comprises means for pivotally connecting one of its extremities to said moving part, and means for pivotally connecting the other of the extremities of said link to said part of said vehicle which is nearer to the road wheel than the pivotal connection of the cylinder.

5. Apparatus according to claim 1 wherein the pivotal connection of said link comprises means for pivotally connecting one of its extremities to the lower end of said plunger, and means for pivotally connecting the other of the extremities of said link to said part of said vehicle which is nearer to the road wheel than the pivotal connection of the cylinder so that oscillatory movement is imparted to said hydraulic means as a whole between its retracted and extended positions resulting in the axis of rotation of said roller being similarly angularly disposed in relation to the vertical at the limits of movement of said hydraulic means.

6. Apparatus according to claim 1 wherein the pivotal connection of said link comprises means for pivotally connecting one of its extremities to a part of the mounting for the roller, and means for pivotally connecting the other of the extremities of said link to said part of said vehicle which is nearer to the road wheel than the pivotal connection of the cylinder so that oscillatory movement is imparted to said hydraulic means as a whole between its retracted and extended positions resulting in the axis of rotation of said roller being similarly angularly disposed in relation to the vertical at the limits of movement of said hydraulic means.

7. Apparatus according to claim 1 wherein the pivotal connection of said link comprises means for pivotally connecting one of its extremities to said moving part, and means for pivotally connecting the other of the extremities of said link to said part of said vehicle which is below the pivotal connection of the cylinder and nearer to the road wheel than the pivotal connection of the cylinder so that oscillatory movement is imparted to said hydraulic means as a whole between its retracted and extended positions resulting in the axis of rotation of said roller being similarly angularly disposed in relation to the vertical at the limits of movement of said hydraulic means.

8. An apparatus according to claim 1 wherein said vehicle has a rear axle, a bracket fixed to the rear axle including a part for the pivotal connection for the cylinder, and another bracket forming said part of said vehicle and also forming another part for an anchorage on the rear axle for a vehicle spring, and wherein the pivotal connection of said link comprises means for pivotally connecting one of its extremities to the mounting for the roller, and means for pivotally connecting the other of the extremities of said link to a part of said other bracket which is nearer to the road wheel than the pivotal connection of the cylinder so that oscillatory movement is imparted to said hydraulic means as a whole between its retracted and extended positions resulting in the axis of rotation of said roller being similarly angularly disposed in relation to the vertical at the limits of movement of said hydraulic means.

9. Apparatus according to claim 1 wherein the pivotal connection of said link comprises means for pivotally connecting one of its extremities to said moving part, and means for pivotally connecting the other of the extremities of said link to said part of said vehicle, and wherein said last-mentioned pivotal means embodies a torsion spring secured at one end to a fixed pin about which said link swings, and the other end of which spring engages the link whereby the spring tends to swing the link upwards and inwards.

10. Apparatus according to claim 7 wherein said vehicle has a rear axle, and a bracket connected to said rear axle having an upper part and a lower part, the pivotal connection for said cylinder including said upper part of said bracket, said means for pivotally connecting the other of the extremities of said link to said part of said vehicle including said lower part of said bracket.

References Cited in the file of this patent

UNITED STATES PATENTS

| | | |
|---|---|---|
| 1,513,282 | Sheets | Oct. 28, 1924 |
| 1,548,182 | Burgin | Aug. 4, 1925 |
| 1,758,964 | Myers | May 20, 1930 |
| 1,928,305 | Blakesley | Sept. 26, 1933 |
| 2,050,690 | Connell | Aug. 11, 1936 |
| 2,165,461 | Dreisbach | July 11, 1939 |
| 2,167,929 | Johnson | Aug. 1, 1939 |
| 2,358,592 | Quinn | Sept. 19, 1944 |
| 2,364,553 | Rische | Dec. 5, 1944 |
| 2,685,934 | Coloma | Aug. 10, 1954 |
| 2,746,554 | Matthews | May 22, 1956 |
| 2,751,989 | Dreisbach | June 26, 1956 |
| 2,870,851 | Clark | Jan. 27, 1959 |
| 2,882,985 | Clark | Apr. 21, 1959 |

FOREIGN PATENTS

| | | |
|---|---|---|
| 553,492 | Italy | Dec. 27, 1956 |
| 286,303 | Switzerland | Feb. 2, 1953 |